United States Patent [19]

Yasuhara et al.

[11] 4,158,311

[45] Jun. 19, 1979

[54] PRESSURE SENSING DEVICE

[75] Inventors: Takeshi Yasuhara; Mitsuru Tamai; Tadanori Yuhara; Isamu Asano, all of Kawasaki, Japan

[73] Assignee: Fuji Electric Co., Ltd., Kawasaki, Japan

[21] Appl. No.: 913,162

[22] Filed: Jun. 6, 1978

[30] Foreign Application Priority Data

Jun. 9, 1977 [JP] Japan .................................. 52-67281

[51] Int. Cl.² ............................................... G01L 9/12
[52] U.S. Cl. ........................................ 73/718; 73/724; 361/283
[58] Field of Search ................................ 73/715–728; 92/103 M, 1; 361/283

[56] References Cited

U.S. PATENT DOCUMENTS

| | | | |
|---|---|---|---|
| 2,999,386 | 9/1961 | Wolfe | 73/718 |
| 3,027,769 | 4/1962 | Coon | 73/724 |
| 3,800,413 | 4/1974 | Frick | 73/718 |

*Primary Examiner*—Donald O. Woodiel
*Attorney, Agent, or Firm*—Sughrue, Rothwell, Mion, Zinn and Macpeak

[57] ABSTRACT

A compact sensing device is provided which the tension applied to the sensing member is substantially uniform and free of thermally changing. Either the sensing member itself or a clamping member disposed around the device or both, are made of a precipitation hardenable metal which will contract during a heat treatment. If the sensing member is thermally contracted a uniform radial tension will result, and if the clamping member is contracted a uniform clamping force applied to the device for tensioning the diaphragm will be provided without the necessity of clamping bolts.

19 Claims, 7 Drawing Figures

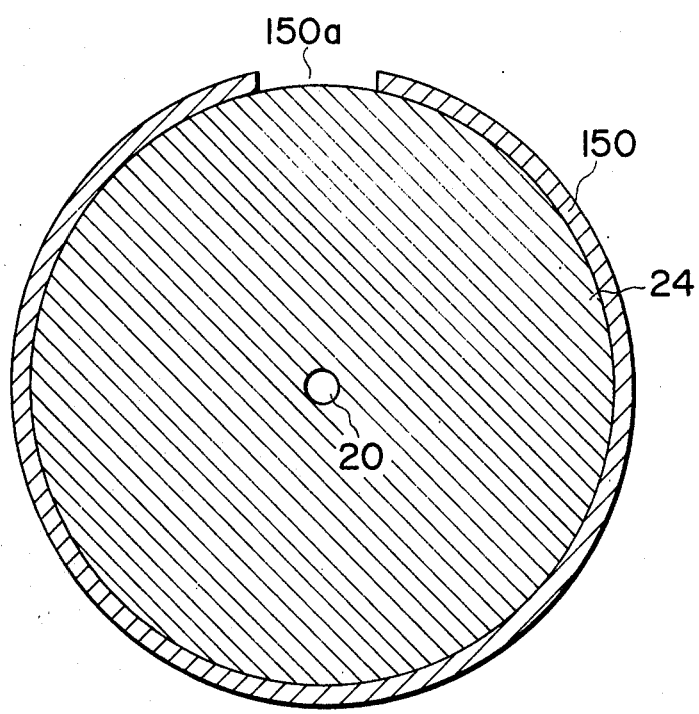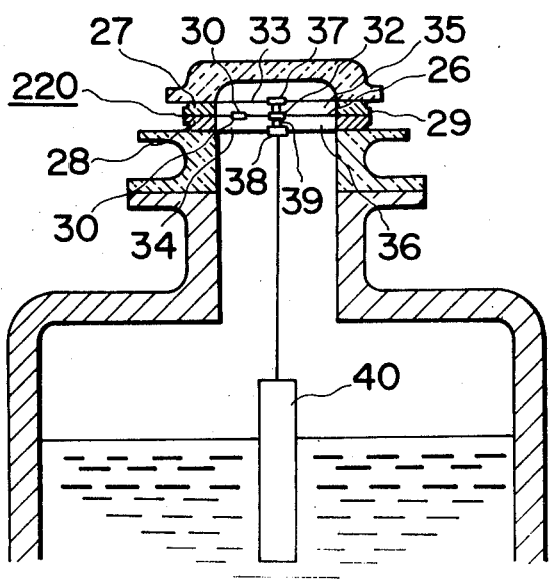

4,158,311

PRESSURE SENSING DEVICE

BACKGROUND OF THE INVENTION

This invention relates to a pressure or differential pressure measuring device wherein a deformation of a flexible sensing disk, such as metallic diaphragm in response to a pressure is detected, and more particularly, to a new disk material and a device for supporting the flexible disk for use in the pressure or differential pressure measuring device.

Conventionally, a substantially rigid metal ring is used to fixedly secure the sensing diaphragm to the housing. The peripheral end of the diaphragm is connected to the metal ring by welding, however, in this case the initially flat diaphram may be corrugated or the tension exerted thereon may not be uniform due to thermal expansion caused by the welding. These drawbacks should be eliminated in order to permit desirable operation of the diaphragm.

In order to obviate these drawbacks, a conventional differential pressure measuring device, shown in FIG. 1, includes a differential pressure detecting portion 1 formed in a generally cylindrical frame, and also provided are a first housing 2 and a second housing 3, into which insulating materials 4 and 5 made of glass or ceramic are filled. Each inner axial surface of the insulating materials is in a hemi-spherical shape to which metal foils 6 and 7 are secured to function as capacitor plates. The first and the second housings 2 and 3 are symmetrically formed to confront the metal foils with each other. Contacting portions of these housings 2 and 3 are provided with annular ridges 9 and 91, and annular grooves 10 and 101 having wedge-like cross section. Inner contacting portions of these housings are provided with conical recesses 110 and 111 having a height d. A sensing diaphragm 8 is interposed between the housings 2 and 3 and is fixed thereto at the ridge portions 9 and 91 by welding. A first measuring chamber 11 is determined by a space defined between the spherical surface of the first insulation 4 and the measuring diaphragm 8, and a second measuring chamber 12 is determined by a space defined between the spherical surface of the second insulation 5 and the sensing diaphragm 8. The differential pressure detecting portion 1 is supported by first and second casings 13 and 14 both of which are tightly secured to each other by fixing bolts 15 and 15. First and second pressure chambers 18 and 19 are provided between the first casing and the first insulation and between the second casing and the second insulation, respectively. An input pressure is introduced into a first measuring chamber 11 through a hole 16 formed in the first casing 13, the first pressure chamber 18 and a bore 20 formed in the first insulation 4, and a second input pressure or reference pressure is introduced into a second measuring chamber 12 through a hole 17 formed in the second casing 14, the second pressure chamber 19 and a bore 21 formed in the second insulation 5.

When a pressing force P is applied to the first and the second housings 2 and 3 by fastening the first and second casings 13 and 14 together by means of the bolts 15, since the peripheral ends of the housings 9 and 91 are tapered, the peripheral ends are urged radially outwardly due to the pressing force P, to reduce the height d while increasing the diameter of the ridge portion so that tensile stress is applied to the sensing diaphragm radially outwardly to thereby eliminate non-uniform or local tension of the diaphragm.

With this structure, the supporting plates 15 and 16 and a plurality of bolts 17 around the periphery thereof are required, so that a compact structure is not obtainable. Further, the thermal expansion coefficient of the housings 2 and 3, made of stainless steel, is $17 \times 10^{-6}$ to $18 \times 10^{-6}$, whereas the thermal expansion coefficient of the supporting plates 15 and 16 and the bolts 17 made of steel is $10 \times 10^{-6}$ to $11 \times 10^{-6}$, so that the clamping force may be changed with changing temperature due to the relatively large difference of the thermal expansion coefficient, resulting in the degradation of the sensing characteristic of the diaphragm.

Another method of assembling the pressure measuring device has been proposed wherein the sensing diaphragm is welded to the outer peripheral surface of the housings 2 and 3 while maintaining a predetermined tension. However, such a method is disadvantageous in that the diaphragm may be deformed due to the welding, so that it would be rather difficult to obtain a sensing diaphragm to which stable and uniform tension is applied.

SUMMARY OF THE INVENTION

It is therefore an object of this invention to overcome the above-mentioned drawbacks and to provide an improved pressure measuring or differential pressure measuring device wherein uniform tension is applied to the sensing diaphragm.

Another object of this invention is to provide an economical and compact device which is easily handled and the operation of which is stable over a long duration.

Briefly, and in accordance with the present invention, the sensing diaphragm is made of precipitation hardenable metal which is contracted by heat treatment, and which has high resiliency. The sensing diaphragm is fixed to the housings and then subject to aging treatment and tension is uniformly applied to the entire diaphragm upon completion of the aging treatment. Alternatively, in order to eliminate the need for the casings and securing bolts, a fixing plate of precipitation hardenable material may be secured to the outer periphery of the sensing device and then subjected to an aging or heat treatment by which it is contracted.

BRIEF DESCRIPTION OF THE DRAWINGS

In the drawings:

FIG. 5 shows a cross-sectional elevation taken along the line V—V in FIG. 3;

FIG. 6 is a schematic view showing the application of a third embodiment of the present invention to a device for measuring liquid level.

DETAILED DESCRIPTION OF THE INVENTION

Figure 1:
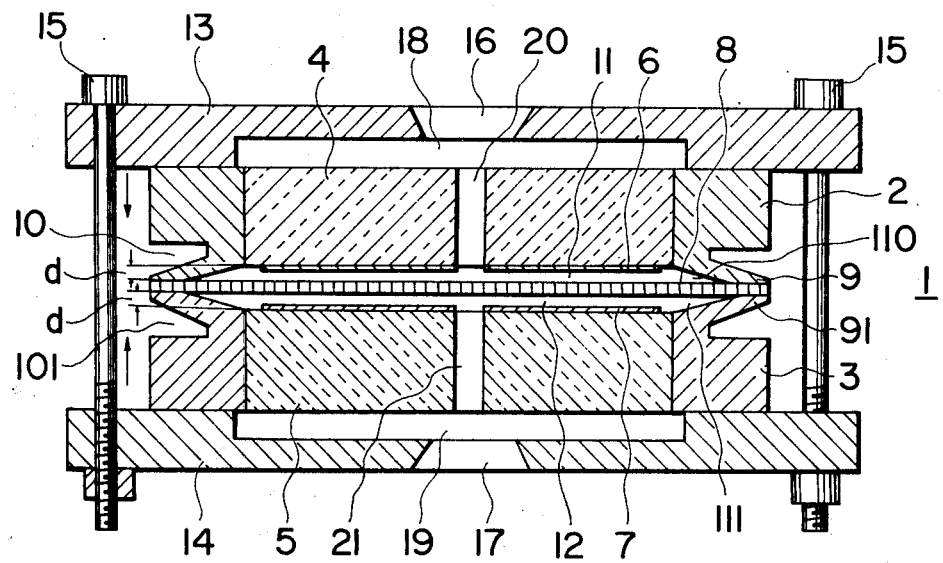
FIG. 1 shows a cross-sectional elevation according to the conventional differential pressure sensing device.
Figure 2:
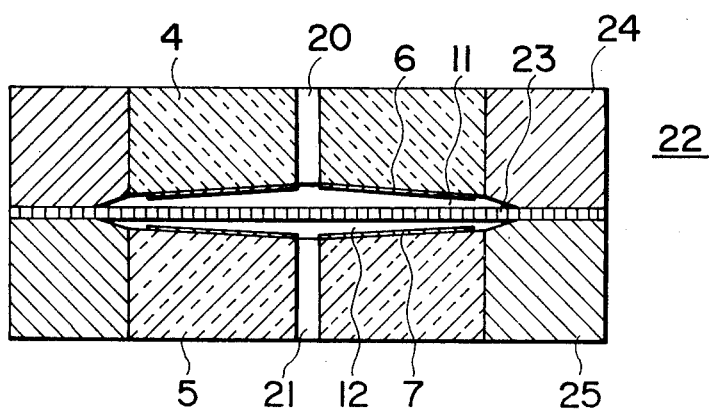
FIG. 2 shows a cross-sectional elevation of the essential part of a sensing device according to one embodiment of the present invention.

The present invention will now be described in detail with reference to FIG. 2 wherein like parts and components are designated by the same reference numerals and characters as those shown in FIG. 1.

A differential pressure sensing portion 22 includes a generally cylindrical first housing 24 and a second housing 25 each having a space therein. First and second insulating materials 4 and 5 are filled in the spaces of the housings 24 and 25, respectively, and the inner surfaces of these insulations are spherically concave and are provided with metal foils 6 and 7 to function as capacitor plates. A sensing diaphragm 23 is interposed between the housings 24 and 25, the peripheral ends of which secure the peripheral end of the sensing diaphragm 23 by welding.

The material of the sensing diaphragm 23 according to the present invention is precipitation hardenable metal having high resiliency, such as (a) product name "Elinver" consisting of Ni by weight of 36%; Cr, 12 wt%; Mn, 1 to 2 wt%; W, 1 to 3 wt%; Si, 1 to 2 wt%; C, 0.8 wt%; and Fe, the remainder.

(b) product name "thermelast" consisting of Co by weight of 40%; Ni, 26 wt%; Cr, 12 wt%; Mo, 4 wt%; W, 4 wt%; Ti, 1 wt%; Mn, 1.4 wt%; Be, 0.2 wt%; and the remainder Fe.

(c) product name "Elgiloy" consisting of Co by weight of 40%; Ni, 15 wt%; Cr, 20 wt%; Mo, 7 wt%; Mn, 2 wt%; Be, 0.04 wt%; C, 0.15 wt%; and the remainder Fe.

(d) product name "Nickel-Span C" consisting of Ni by weight of 42%; Cr, 5.3 wt%; Mn, 0.5 wt%; Si, 0.3 wt%; Ti, 2.4 wt%; Al, 0.4 wt%; Cu, 0.05 wt%; C, 0.02 wt%; and the remainder Fe.

(e) product name "KRN" consisting of Co by weight of 40%; Ni, 15 wt%; Cr, 20 wt%; Mo, 7 wt%; Mn, 1.5 wt%; Si, 0.45 wt%; Be, 0.05 wt%; Cu, 0.15 wt%; and the remainder Fe.

In precipitation hardenable metals having high resiliency as above, intermetallic compounds are precipitated in crystals to contract the total volume after the metal is subjected to aging treatment at high temperatures ranging from about 500° to 600° C. for one hour.

According to the present invention the above aging treated precipitation hardenable metal is employed as the sensing diaphragm 23.

Figure 3A:
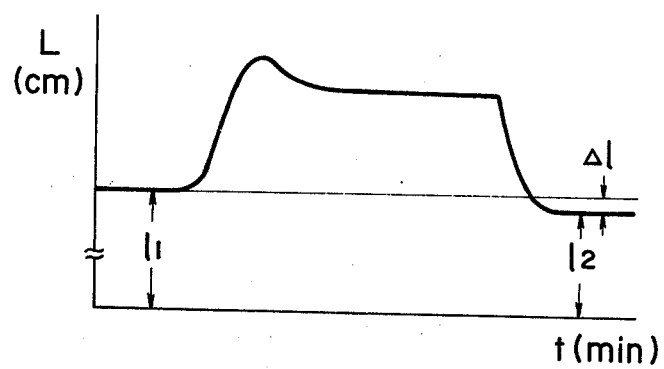
FIG. 3(A) is graphical representation showing the thermal expansion of the precipitation hardenable metal with time.
Figure 3B:
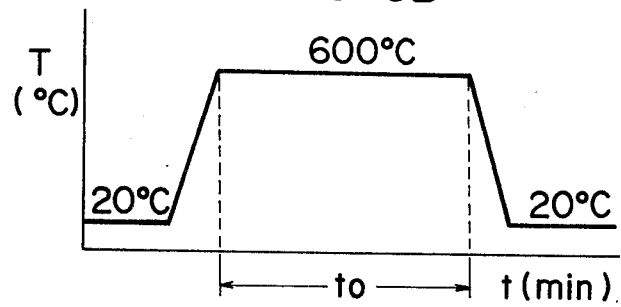
FIG. 3(B) is a graphical representation showing temperature change of the metal with time.

Referring now to FIGS. 3(A) and 3(B), and initially to FIG. 3(B), the precipitation hardenable metal is heated to the temperature of 600° C. starting from a room temperature (of 20° C.). The high temperature is maintained for about one hour ($t_o$) and then reduced to the room temperature. In this case, as shown in FIG. 3(A), the metal having an initial length of $l_1$ is thermally expanded for the corresponding time $t_o$. Thereafter the length of the metal is reduced to have a length $l_2$ when the metal is cooled to room temperature. The length $l_2$ is shorter than $l_1$ as shown in length differential $\Delta l$. $\Delta l$ is experimentally obtained and is approximately 0.1 to 0.2% of the length $l_1$.

Therefore, in the present invention such contraction is utilized to tension the diaphragm in the pressure detecting portion 22. That is, the precipitation hardenable metal is firstly fixed to the first and second housings 24 and 25, and thereafter subject to aging treatment and, as explained above, tension is applied to the metal due to contraction thereof since the peripheral end of the metal is fixed to the housings 24 and 25, to thereby eliminate or negate disadvantageous local tension caused by the welding. Of course, the same effect and function can be realized if the diaphragm is firstly fixed to the housings by brazing or pasting.

The second embodiment according to this invention will now be described with reference to FIG. 4 wherein like parts and components are designated by the same reference numerals and characters as those shown in FIG. 2. A differential pressure sensing device 22 includes first and second housings 24 and 25 which house insulations 4 and 5. An outer peripheral end of a sensing diaphragm 23 is welded to the housings 24 and 25. The sensing diaphragm in this instance may or may not be made of a precipitation hardenable material. The inner annular planes of the first and the second housings sandwich the peripheral end portion of the sensing diaphragm 23. Outer peripheral surfaces of the housings are tightly surrounded by a fixing plate 150 made of one of the above-described precipitation hardenable metals. After the fixing plate 150 is secured to the outer peripheral surfaces of the housings, the plate is subjected to a thermal, or aging, treatment.

Figure 4:
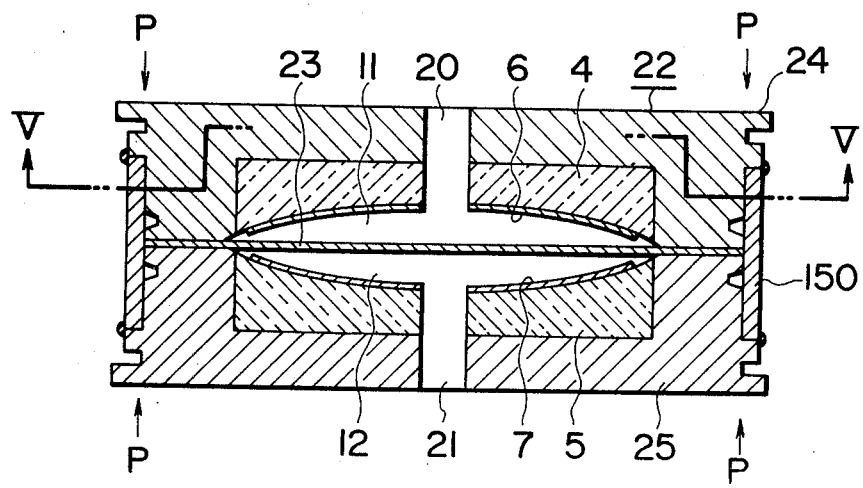
FIG. 4 shows a cross-sectional elevation according to a second embodiment of the present invention.

As shown in FIGS. 4 and 5, the fixing plate 150 made of precipitation hardenable metal is welded to the outer peripheral surfaces of the housings 24 and 25, and thereafter the assembled device is subjected to heat treatment according to FIGS. 3(A) and 3(B). The fixing plate is preferably in the form of a pipe, or C-shape having a gap 150a, however alternatively, a plurality of subdivided plates may be provided around the housing along the axial direction thereof. For instance providing a plurality of gaps 150a would result in the division of the fixing member 150 into a plurality of plates, each of which extends in the axial direction in order to secure both housing members.

FIG. 6 shows the third embodiment of this invention which may be used to measure liquid level by utilizing a floating member 40 connected to a liquid lelel measuring device 220.

A sensing leaf spring disk 26 is centrally disposed in the device 220 and is supported to first and second housings 27 and 28 by welding. A fixing plate 29 is fixed to outer peripheral surfaces of the housings. The fixing plate is made of precipitation hardenable metal, and is subjected to aging treatment to ensure tight clamping between the housings. The disk spring 26 is provided with an electrical detecting element such as a strain gauge 30, 30 at opposite surfaces thereof to detect the deformation of the spring plate 26.

In order to avoid characteristic change of the strain gauge due to moisture, a pair of sealing diaphragms 33 and 34 are fixed to the respective outer planar surfaces of the housings, and non-compressive liquid such as silicone oil is filled in the spaces 35 and 36 defined between the sealing diaphragm 33 and the disk 26, and between the sealing diaphragm 34 and the disk 26, respectively. Supporting plates 37 and 38 are provided in the sealing diaphragm 33 and 34, respectively, and a supporting plate 32 provided in the disk 26 is connected to the supporting plates 37 and 38 by means of a connecting member 39 so that they operate integrally with each other. Since the plate 38 is connected to the floating member 40, the up and down movement of the float member caused by change of the buoyancy due to the change of the liquid level is transmitted to a support member 32 to thereby deform the spring disk plate 26.

What is claimed is:

1. In a pressure measuring device of the type in which a flexible sensing member is disposed between first and second housing members and the amount of movement of said sensing member is indicative of the magnitude of a pressure applied thereto, said device further including a fixing member disposed around the periphery of said housing members, the improvement comprising:
at least one of said sensing and fixing members being made of a precipitation hardenable metal contracted by a heat treatment process, said one of said members being under stress as a result of having been first secured to said housing members and then subjected to said heat treatment process.

2. A pressure measuring device according to claim 1, wherein a space is formed between said housing members and is separated into first and second pressure receiving chambers by said sensing member which comprises a highly flexible sensing diaphragm so that the movement of said sensing diaphragm is indicative of the difference between the pressures in said chambers.

3. A pressure measuring device according to claim 2, wherein one of said chambers contains a reference pressure.

4. A pressure measuring device according to claim 3, wherein said fixing member comprises a plurality of plates spaced around the periphery of said housing members.

5. A pressure measuring device according to claim 3, wherein said fixing member is substantially cylindrical.

6. A pressure measuring device according to claims 2 or 3, wherein said sensing member is made of said precipitation hardenable material and said stress is a uniform radial tension.

7. A pressure measuring device according to claim 6, wherein said precipitation hardenable metal is composed of: Ni, 36 wt%; Cr, 12 wt%; Mn, 1 to 2 wt%; W, 1 to 3 wt%; Si, 1 to 2 wt%; C, 0.8 wt%; and the remainder Fe.

8. A pressure measuring device according to claim 6, wherein said precipitation hardenable material is composed of: Co, 40 wt%; Ni, 26 wt%; Cr, 12 wt%; Mo, 4 wt%; W, 4 wt%; Ti, 1 wt%; Mn, 1.4 wt%; Be, 0.2 wt%; and the remainder Fe.

9. A pressure measuring device according to claim 6, wherein said precipitation hardenable material comprises: Co, 40 wt%; Ni, 15 wt%; Cr, 20 wt%; Mo, 7 wt%; Mn, 2 wt%; Be, 0.04 wt%; C, 0.15 wt%; and the remainder Fe.

10. A pressure measuring device according to claim 6, wherein said precipitation hardenable mateiral comprises: Ni, 42 wt%; Cr, 5.3 wt%; Mn, 0.5 wt%; Si, 0.3 wt%; Ti, 2.4 wt%; Al, 0.4 wt%; Cu, 0.05 wt%; C, 0.02 wt%; and the remainder Fe.

11. A pressure measuring device according to claim 6, wherein said precipitation hardenable material comprises: Co, 40 wt%; Ni, 15 wt%; Cr, 20 wt%; Mo, 7 wt%; Mn, 1.5 wt%; Si, 0.45 wt%; Be, 0.05 wt%; Cu, 0.15 wt%; and the remainder Fe.

12. A pressure measuring device according to claim 1, further comprising:
float means disposed on a body of liquid;
connecting means for mechanically connecting said float means to said sensing member so that a mechanical pressure corresponding to the level of said liquid will be exerted on said sensing member.

13. A pressure measuring device according to claim 12, wherein said fixing member includes an axial gap.

14. A pressure measuring device according to claims 2, 3 or 1, wherein said fixing member is made of said precipitation hardenable material and said stress is a compressive force exerted on said housing members.

15. A pressure measuring device according to claim 14, wherein said precipitation hardenable metal is composed of: Ni, 36 wt%; Cr, 12 wt%; Mn, 1 to 2 wt%; W, 1 to 3 wt%; Si, 1 to 2 wt%; C, 0.8 wt%; and the remainder Fe.

16. A pressure measuring device according to claim 14, wherein said precipitation hardenable material is composed of: Co, 40 wt%; Ni, 26 wt%; Cr, 12 wt%; Mo, 4 wt%; W, 4 wt%; Ti, 1 wt%; Mn, 1.4 wt%; Be, 0.2 wt%; and the remainder Fe.

17. A pressure measuring device according to claim 14, wherein said precipitation hardenable material comprises: Ni, 42 wt%; Cr, 5.3 wt%; Mn, 0.5 wt%; Si, 0.3 wt%; Ti, 2.4 wt%; Al, 0.4 wt%; Cu, 0.05 wt%; C, 0.02 wt%; and the remainder Fe.

18. A pressure measuring device according to claim 14, wherein said precipitation hardenable material comprises: Co, 40 wt%; Ni, 15 wt%; Cr, 20 wt%; Mo, 7 wt%; Mn, 2 wt%; Be, 0.04 wt%; C, 0.15 wt%; and the remainder Fe.

19. A pressure measuring device according to claim 14, wherein said precipitation hardenable material comprises: Co, 40 wt%; Ni, 15 wt%; Cr, 20 wt%; Mo, 7 wt%; Mn, 1.5 wt%; Si, 0.45 wt%; Be, 0.05 wt%; Cu, 0.15 wt%; and the remainder Fe.

* * * * *